United States Patent Office 3,121,305
Patented Feb. 18, 1964

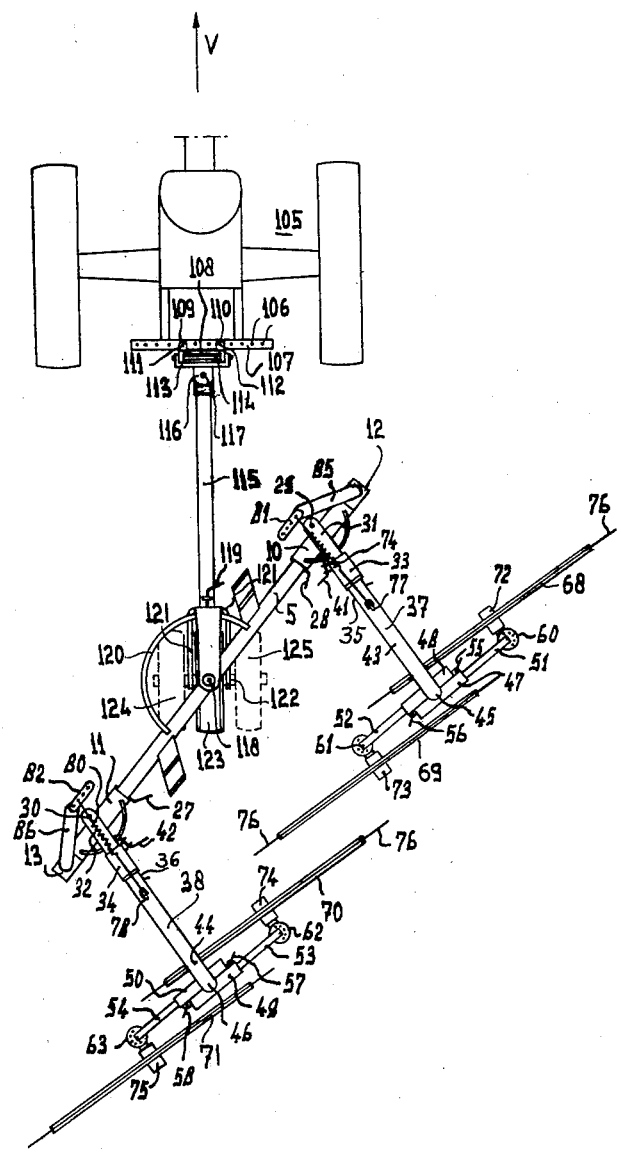

3,121,305
DEVICE FOR LATERALLY DISPLACING CROP LYING ON THE GROUND
Cornelis van der Lely, Zug, Switzerland, assignor to C. van der Lely N.V., Maasland, Netherlands
Original application Jan. 4, 1957, Ser. No. 632,445, now Patent No. 2,966,773, dated Jan. 3, 1961. Divided and this application Dec. 7, 1960, Ser. No. 74,282
Claims priority, application Netherlands Jan. 6, 1956
7 Claims. (Cl. 56—377)

This invention relates to a device for laterally displacing crop lying on the ground and of the type comprising a frame carrying a plurality of rake wheels in such a manner that when the implement is in operation the rake wheels rotate and laterally displace the crop.

This application is a divisional application based on my earlier filed application Serial Number 632,445 filed January 4, 1957, now Patent Number 2,966,773.

According to the invention there is provided a device of the above-noted type, wherein the rake wheels are carried by connecting elements which are connected to a main frame beam which lies obliquely to the intended direction of travel of the device, a draw bar being mounted on said main beam so as to be rotatable about a substantially vertical axis and being fixable in different positions, at least one ground wheel for supporting the frame being connected to said draw bar near said vertical axis and being rotatable about said vertical axis with the draw bar, said ground wheel having a fixed position with regard to said draw bar during working.

For a better understanding of the invention and to show how the same may be carried into effect, reference will next be made, by way of example, to the sole figure in the accompanying drawing which is a plan view of an implement according to the invention.

The device shown in the drawing is drawn by a tractor 105 which at its rear carries a beam 107 formed with apertures 106. A wide fork 108 having perforated lugs 109 and 110 is detachably but immovably connected to the beam 107 by means of pins or bolts 111 and 112. A second wide fork 113 is pivotally connected to the fork 108 by means of a horizontal hinge pin 114, there being but little play between the two forks.

A draw-bar 115 is connected to the fork 113 by means of a hinge pin 116 which has a vertical axis 117, the play at the hinge pin 116 again being small so that the draw-bar 115 can only turn about its longitudinal axis if the tractor 105 turns about its longitudinal axis. The drawbar 115 is pivotally connected to a beam 5.

The beam 5 is tubular and near its ends, carries two sleeves 10 and 11. The sleeves 10 and 11 are held in place on the beam 5 by collars 12 and 13 mounted on the extremities of the beam 5, which collars 12 and 13 are detachable but are normally fixed so that they cannot rotate and move axially relative to the beam 5. The sleeves 10 and 11 are held in position against the collars 12 and 13 by means of removable locking pins 27 and 28, which pass through the beam 5. The pins 27 and 28, however, do not prevent the sleeves 10 and 11 from rotating about the beam 5.

The sleeves 10 and 11 are provided with hinge pins 29 and 30, about which forks 31 and 32 are rotatable, the hinge pins 29 and 30 having a substantially vertical position in most working positions. The forks 31 and 32 carry sockets 33 and 34 in which the substantially horizontally forward ends 35 and 36 of connecting elements in the form of axles 37 and 38 are fixed so as to be rotatable but axially non-displaceable.

The forks 31 and 32 can be fixed by means of locking pins 41 and 42 which can be inserted in apertures formed in lugs connected to the forks 31 and 32 respectively and can be passed through any one of a member of apertures formed in arcuate strips connected to the beam 5.

The connecting elements 37 and 38 extend from their front ends 35 and 36 obliquely upwards to their highest points 43 and 44 from whence the rear ends 45 and 46 extend vertically downwards. The ends of the bows are connected to pairs of substantially horizontal tubes 47, 48 and 49, 50, the tubes 47, 48 and the end 45 being fixedly connected to one another, and the tubes 49, 50 and the end 46 being likewise fixedly connected one to the other. Rods 51, 52, 53 and 54 are rotatably and axially movably mounted in the tubes 47, 48, 49 and 50, the rods being capable of being fixed in the tubes by means of locking devices 55, 56, 57 and 58. One extremity of each rod 51–54 is disposed in its respective tube 47–50, while the free extremity is connected by means of a fixable hinge connection 60, 61, 62 or 63 to an axle 64, 65, 66 or 67 of a respective one of four rake wheels 68, 69, 70 and 71, the hubs 72, 73, 74 and 75 of which are freely rotatable about said axles. Each rake wheel lies close to the associated fixable hinge connection, the plane of a rake wheel being spaced from the hinge axis by a distance less than a quarter of the rake wheel diameter. The rake wheels are all of the same construction and each is provided with circumferential tines or teeth 76.

The connecting elements 37 and 38 carry eyes 77 and 78, to which the rear ends of helical springs 79 and 80 are connected, the front ends of the springs 79 and 80 being connected to the upper ends 83 and 84 of rods 85 and 86, which are fixedly connected to the collars 12 and 13, the upper ends of the rods carrying apertured members 81 and 82. When the front end 108 of the drawbar 115 is held at a certain height above the ground by means of a tractor or the like, the springs 79 and 80 serve to reduce the pressure of the rake wheels 68–71 on the ground.

In the position shown in the drawing, the device can act as a side delivery rake delivering to the left, all movable connections, which are provided with locking devices, being fixed in the positions shown with the exception of the connecting elements 37 and 38 in the sockets 33 and 34, which are fixed in such a way that the connecting elements 37 and 38 can turn through a small angle in these sockets about axes which coincide with the centre lines of the sockets. The drawbar 115 is rotatable about a vertical pin 118, and a locking pin 119 is provided for securing the drawbar 115 relative to an arcuate strip 120 which is fixedly connected to the beam 5.

A downwardly directed fork 121 is fixedly connected to the drawbar 115 and the axle 122 of a ground wheel 123 is attached to the fork 121. The beam 5 can only cant if the drawbar 115 turns about its longitudinal axis so that any canting movements will, therefore, only be slight. The wheel pressures of the rake wheels will remain substantially equal to each other during slight canting movements of the beam 5 by virtue of the rotatability of the sleeves 10 and 11 and for the further reasons described above.

It is to be noted that, in the hitherto known combinations of a tractor with a hay raking device which is connected to the tractor by means of a drawbar carrying a ground wheel, there is generally considerable play at the hinge connection between the drawbar and the tractor so that the tractor can roll about its longitudinal axis without affecting the hay raking device.

An advantage of the construction of the invention is that only one ground wheel is required so that the entire weight of the device rests on the ground wheel, thus giving rise to a resistance against any tendency to slip sideways. The ground wheel is pivotable with drawbar 115 about the axis defined by pin 118. It is also possible to replace the ground wheel 123 by two ground wheels 124 and 125 which in the figure are shown by dotted lines and which have the same axle 122 as the wheel 123 so that the resistance to slipping is increased. In all events, the ground wheel or wheels is or are connected to the drawbar adjacent pin 118 and has or have a fixed position relative to the drawbar during working.

A further advantage of the construction is that the working width of the implement can be altered by simply rotating the drawbar about the pin 118 and fixing the drawbar in a new position with regard to the frame beam 5.

What I claim is:

1. Apparatus for working the ground and adapted for movement in a determinable direction of travel, the apparatus comprising rake wheels for working the ground, a drawbar adapted for being connected to a vehicle for movement therewith, a frame beam obliquely positioned relative to said direction of travel and adjustably coupled to said drawbar for relative pivotal movement about a vertical axis, means locking said frame beam and said drawbar together in an adjusted position to prevent relative movement about said vertical axis, means coupled to said frame beam and supporting said rake wheels, and at least one ground wheel supporting the frame for ground traversing movement and connected to said drawbar adjacent said vertical axis and pivotable with said drawbar about said vertical axis, said ground wheel having a fixed position relative to said drawbar.

2. A device according to claim 1, wherein the frame beam lies forwardly of the rake wheels relative to the direction of travel, the drawbar being positioned forwardly of said frame beam.

3. A device according to claim 2, wherein the drawbar is coupled to said frame beam substantially midway of said beam.

4. A device according to claim 1, wherein two ground wheels are connected to the drawbar, said ground wheels being freely rotatable about the same horiontal axis.

5. A device according to claim 1, wherein said drawbar has one end connected to said frame beam and an end remote therefrom comprising a coupling member on said drawbar at the remote end thereof, said coupling member being fixed with respect to the longitudinal axis of the drawbar.

6. A device according to claim 5, wherein the coupling member comprises a fork for connecting the drawarm to said vehicle, said fork being rotatably coupled to said drawarm about a horizontal axis which is transverse to the longitudinal axis of the drawbar.

7. A device according to claim 6, wherein the coupling member comprises a further fork, the first said fork being coupled to said further fork for relative movement about said horziontal axis, said coupling member further including a hinge pin which is vertically positioned connecting said drawbar and said further fork.

References Cited in the file of this patent

UNITED STATES PATENTS

| | | |
|---|---|---|
| 2,966,773 | Van der Lely | Jan. 3, 1961 |

FOREIGN PATENTS

| | | |
|---|---|---|
| 1,083,596 | France | June 30, 1954 |
| 1,084,872 | France | July 13, 1954 |
| 298,789 | Switzerland | Aug. 2, 1954 |
| 532,560 | Belgium | Oct. 30, 1954 |
| 729,874 | Great Britain | May 11, 1955 |
| 183,982 | Austria | Dec. 10, 1955 |